United States Patent [19]

Murabayashi et al.

[11] Patent Number: 4,862,296
[45] Date of Patent: Aug. 29, 1989

[54] PCM SIGNAL REPRODUCING APPARATUS WITH ADJUSTABLE PHASE LOCK LOOP CIRCUITRY

[75] Inventors: Noboru Murabayashi, Tokyo; Keiji Kanota, Kanagawa, both of Japan

[73] Assignee: Sony Corporation, Tokyo, Japan

[21] Appl. No.: 244,863

[22] Filed: Sep. 15, 1988

[30] Foreign Application Priority Data

Sep. 21, 1987 [JP] Japan ................ 62-238570

[51] Int. Cl.$^4$ .............................. G11B 5/02
[52] U.S. Cl. ........................ 360/51; 360/65; 360/67
[58] Field of Search ............... 360/51, 65, 67, 46; 331/17

[56] References Cited

U.S. PATENT DOCUMENTS

| | | | |
|---|---|---|---|
| 4,231,071 | 10/1980 | Anderson | 360/51 |
| 4,472,818 | 9/1984 | Zapisek et al. | 360/51 |
| 4,510,461 | 4/1985 | Dickes et al. | 331/17 |
| 4,534,044 | 8/1985 | Funke et al. | 360/51 |
| 4,542,351 | 9/1985 | Okada | 331/17 |
| 4,577,241 | 3/1986 | Wilkinson | 360/51 |
| 4,644,419 | 2/1987 | Iinuma et al. | 360/51 |
| 4,780,772 | 10/1988 | Shibaya et al. | 360/51 |

FOREIGN PATENT DOCUMENTS 58-105882  1/1985  Japan .................... 360/51

Primary Examiner—Vincent P. Canney
Assistant Examiner—Kevin J. Fournier
Attorney, Agent, or Firm—Alvin Sinderbrand

[57] ABSTRACT

A clock regeneration circuit for use in data reproducing apparatus which reproduces and demodulates digital data that has been recorded on a magnetic medium in accordance with different types of modulation having different recording densities, such as biphase-mark modulation and 8-10 modulation, respectively. The clock regeneration circuit includes a phase locked loop for regenerating a clock signal from the clock component included in the reproduced data and comprises a switchable voltage controlled oscillator for selecting the frequency of a reference signal generated thereby in correspondence with the type of modulation which had been used for recording. Also included in the clock regeneration circuit is a phase comparator and a switchable low pass filter for supplying the output of the phase comparator to the voltage controlled oscillator, the time constant of the filter being selected in correspondence with the type of modulation that was used for recording. A control circuit controls the frequency selection of the voltage controlled oscillator and the time constant selection of the low pass filter in accordance with data signals supplied thereto.

13 Claims, 4 Drawing Sheets

FIG.2

| MODULATION SYSTEM | FIRST TYPE OF MODULATION | | | | SECOND TYPE OF MODULATION | | | |
|---|---|---|---|---|---|---|---|---|
| TYPE OF MAG. TAPE | MP TAPE | | ME TAPE | | MP TAPE | | ME TAPE | |
| SP/LP MODE | SP | LP | SP | LP | SP | LP | SP | LP |
| FIRST SW TERMINALS | b1 | b2 | b3 | b4 | b5 | b6 | b7 | b8 |
| SECOND SW TERMINALS | d1 | d2 | d3 | d4 | d5 | d6 | d7 | d8 |

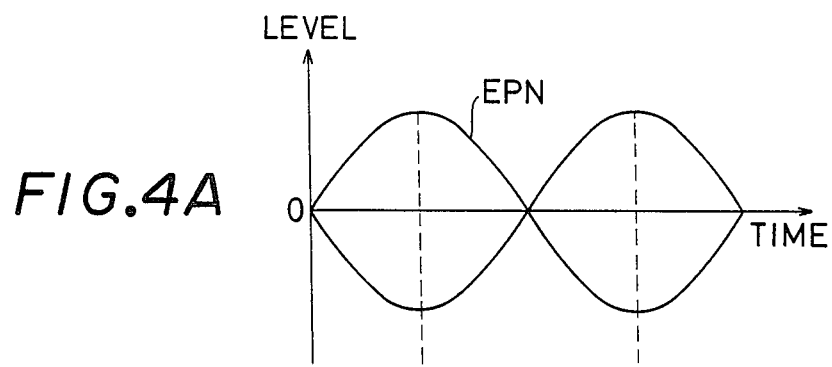
FIG.4A
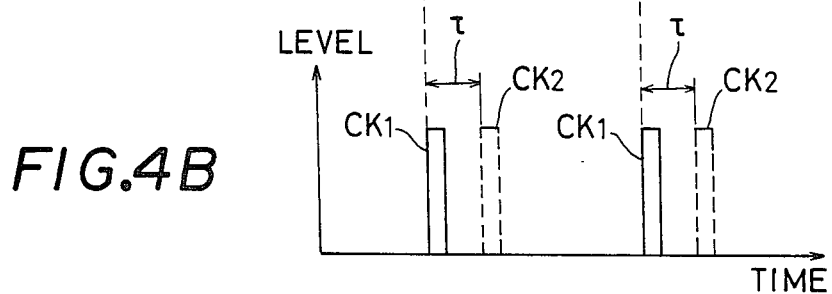
FIG.4B
FIG.5 PRIOR ART
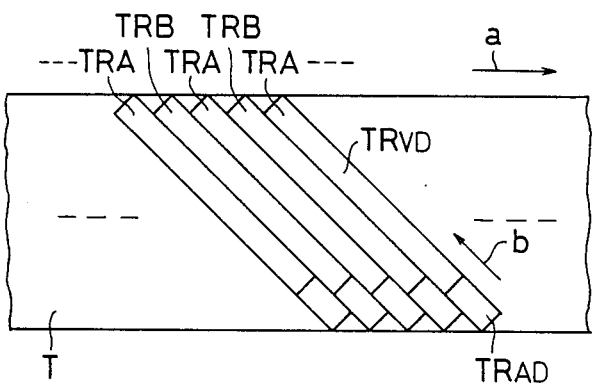

PCM SIGNAL REPRODUCING APPARATUS WITH ADJUSTABLE PHASE LOCK LOOP CIRCUITRY

BACKGROUND OF THE INVENTION

1. Field Of The Invention

This invention relates to data reproducing apparatus and, more particularly, to such apparatus which is capable of reproducing data that had been recorded on a magnetic medium by one of plural types of modulation, such as biphase-mark modulation or 8-10 modulation.

2. Description Of The Prior Art

In one type of data recording system known to those of ordinary skill in the art, audio signals are PCM-encoded, time-base compressed and recorded on a magnetic medium. For example, in a video tape recorder (VTR) of the 8 mm format, the time-compressed PCM-encoded audio signal is modulated and recorded in a portion of the usual slant tracks on magnetic tape. One example of such recording is described in U.S. Pat. No. 4,551,771, assigned to the assignee of the instant invention. A particular type of modulation used to record the time-compressed, PCM-encoded audio signal is biphase-mark modulation.

It has been found desirable to record the aforementioned biphase-mark modulated audio signal in a portion of each of the adjacent slant tracks, with the remainder of each track having video information recorded therein. Typically, two magnetic heads are used to record respective tracks alternately on the tape. Of course, during playback, a head first reproduces the biphase-mark modulated audio signal and then, as the head continues to scan a track, the video signal is reproduced. As described in the aforementioned patent, when one head reproduces the audio portion of the slant track, the other head is in its final phase of reproducing the video portion from an adjacent track.

A conventional audio signal reproducing system used in one type of VTR, such as the aforementioned 8 mm VTR, regenerates a clock signal CK from the biphase-mark modulated audio signal reproduced from the magnetic tape. This regenerated clock signal is used to demodulate the PCM-encoded audio information, thereby recovering the original audio signal for sound reproduction. In a preferred type of clock regeneration circuit a phase locked loop is used to generate a "clean" clock signal that is phase locked to the clock signal component included in the reproduced biphase-mark modulated signal, and also is substantially equal in frequency to that clock component. This clock regeneration circuit and PCM decoder function satisfactorily to recover the audio signals which had been recorded in typical 8 mm VTR format.

Recently, it has been proposed to modify the audio signal modulation technique used in 8 mm VTR recording. One such proposal has suggested that the modulation technique used in rotary head digital audio tape recorders (R-DAT) be used in place of the biphase-mark modulation technique. The R-DAT modulation, although relying on PCM encoding, records audio information with a considerably higher bit rate than is used in biphase-mark modulation. A so-called 8-10 modulation technique, described in U.S. Pat. Nos. 4,617,552 and 4,577,180, both assigned to the assignee of the present invention, has been proposed for 8 mm VTR recording. In the 8-10 modulation technique, an 8-bit signal, such as a PCM signal, is converted into a 10-bit signal and recorded. By using 10 bits, a large number of successive binary "1"s and "0"s can be avoided. This is desired because successive "1"s and "0"s introduce an unwanted DC component to the reproduced digital data. By avoiding or at least minimizing this DC component, clock regeneration can be carried out accurately.

However, it has been found that biphase-mark modulation (referred to simply as a first type of modulation) and 8-10 modulation (referred to simply as a second type of modulation) record information in different frequency bands. Furthermore, these two types of modulation techniques are accompanied by a large difference in their respective sampling or clock frequencies. For example, the sampling/clock frequency used in the first modulation technique (i.e. in biphase-mark modulation) is on the order of about 11.6 MHz, whereas the sampling/clock frequency used in the second modulation technique (i.e. in 8-10 modulation) is on the order of 14.8 MHz. Consequently, systems using these two different types of modulation require different Nyquist conditions for converting electronic signals to magnetic format and they also exhibit different noise distribution spectra. As a result, if one clock regeneration circuit is used to reproduce audio signals which are recorded on magnetic tape in accordance with one modulation technique, the bit-error rate of the demodulated PCM-encoded data is increased when audio information recorded by the other modulation technique is reproduced. That is, the bit-error rate is increased if the clock regeneration circuit normally used to recover biphase-mark modulated signals is used to reproduce 8-10 modulated signals, and vice versa.

OBJECTS AND SUMMARY OF THE INVENTION

Therefore, it is an object of the present invention to provide data reproducing apparatus that can regenerate a clock signal from magnetic recordings in which data has been recorded with different recording densities.

Another object of this invention is to provide data reproducing apparatus which can be used to recover data that had been recorded in accordance with different types of modulation.

A further object of this invention is to provide an improved clock regeneration circuit for use in data reproducing apparatus of the aforementioned type which minimizes the bit-error rate when data that had been recorded in accordance with one or another of different types of modulation is reproduced.

An additional object of this invention is to provide a clock regeneration circuit for recovering a clock signal from data recorded in accordance with different types of modulation.

Various other objects, advantages and features of the present invention will become readily apparent from the ensuing detailed description, and the novel features will be particularly pointed out in the appended claims.

In accordance with the present invention, a clock regeneration circuit is provided for use in data reproducing apparatus of the type which reproduces and demodulates digital data that had been recorded on a magnetic medium in accordance with different types of modulation having different recording densities. The clock regeneration circuit includes a phase locked loop for regenerating a clock signal from a clock component included in the reproduced data and comprises a switchable voltage controlled oscillator for selecting the frequency of a reference signal generated thereby in correspondence with the type of modulation that had been used to record the digital data. Also included in the clock regeneration circuit is a switchable low pass filter for selecting a time constant in correspondence with the type of modulation that had been used to record the digital data, the low pass filter serving to supply a control voltage to the voltage controlled oscillator from a phase comparator included in the phase locked loop. A control circuit controls the frequency selection of the voltage controlled oscillator and the time constant selection of the low pass filter in accordance with data supplied thereto.

In accordance with one aspect of this invention, digital data is reproduced from magnetic tape which may be one of plural different types, and the control circuit additionally controls the frequency selection and time constant selection of the voltage controlled oscillator and of the low pass filter, respectively, as a function of the type of magnetic tape used.

As another aspect of this invention, the digital data may be recorded in one of plural different recording/reproducing modes, and the control circuit further controls the frequency selection and time constant selection of the voltage controlled oscillator and of the low pass filter, respectively, as a function of the recording/reproducing mode that had been used. The different recording/reproducing modes may be the transport speed of the recording medium, such as a normal play speed mode or a long play speed mode.

As a still further aspect of this invention, the control circuit includes a programmed table of frequency and time constant selections, this table being read to provide an output command to the voltage controlled oscillator and to the low pass filter, respectively, to control the frequency and time constant selections thereof. Preferably, the control circuit determines the type of modulation which had been used to record the digital data in response to a detected bit error rate of the reproduced data.

As a still further aspect of this invention, the voltage controlled oscillator includes plural circuits, each adapted to establish a respective reference signal frequency, and a switching circuit responsive to the control circuit for connecting one of these circuits to the oscillator. Similarly, the low pass filter includes plural filter circuits, each having a respective time constant, and a switching circuit responsive to the control circuit for connecting one of these filter circuits between the phase comparator and the voltage controlled oscillator.

BRIEF DESCRIPTION OF THE DRAWINGS

The following detailed description, given by way of example, will best be understood in conjunction with the accompanying drawings in which:

FIG. 2 is a table illustrative of the manner in which the present invention operates;

FIGS. 4A and 4B illustrate signal waveforms and represent the prior art problems which are overcome by the present invention; and FIG. 5 is a diagrammatic representation of a typical track pattern of information of the type advantageously reproduced by the present invention.

DESCRIPTION OF A PREFERRED EMBODIMENT

Figure 1:
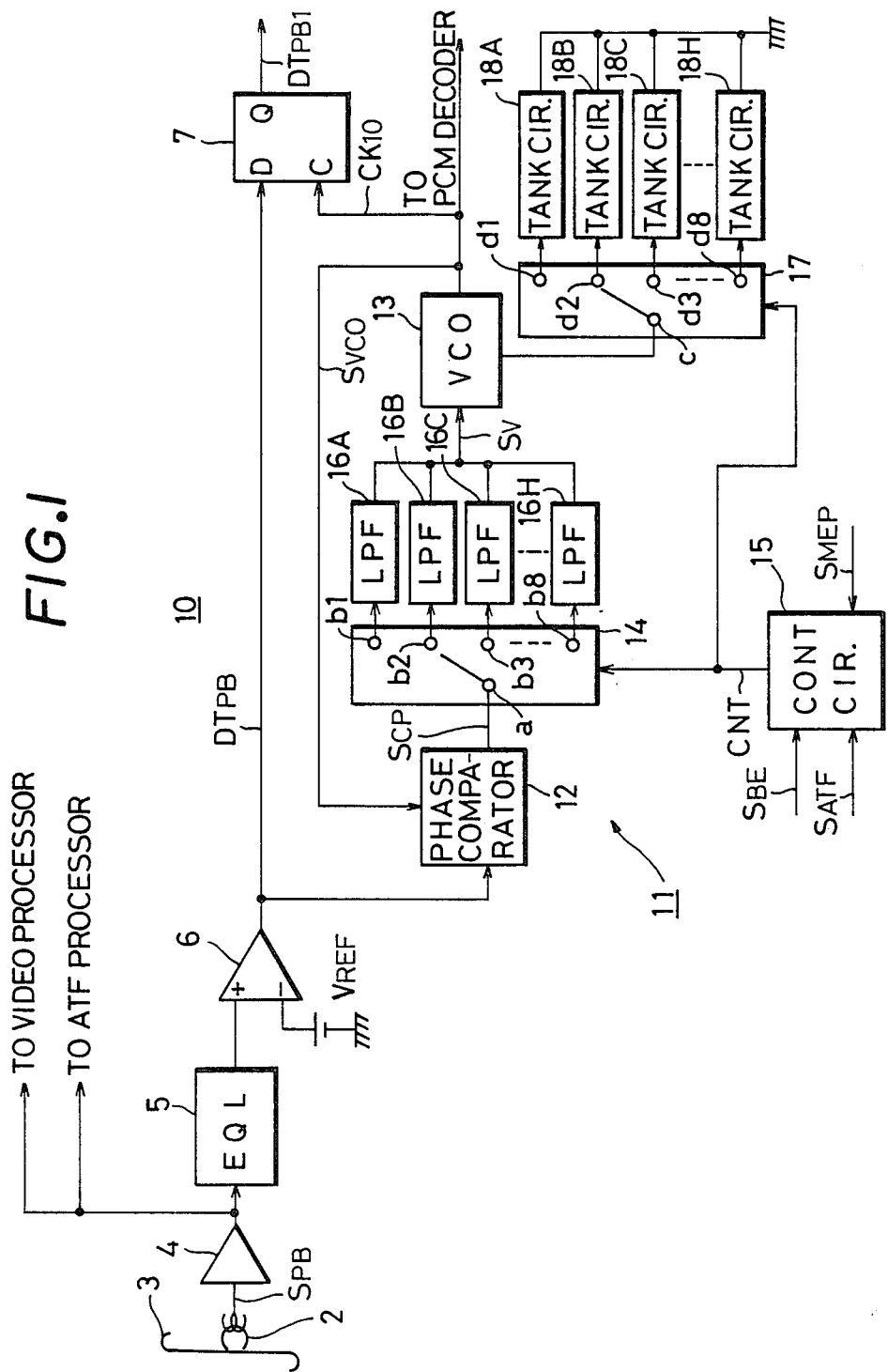
FIG. 1 is a block diagram of a preferred embodiment of the present invention.

FIG. 1 is a block diagram of a preferred embodiment of the present invention illustrating a clock regeneration circuit used with data reproducing apparatus to recover and demodulate digital data reproduced from a magnetic recording medium, wherein the data may be recorded by different types of modulation and, additionally, may be recorded in different formats and on magnetic media of different types. However, so that the advantages attained by this invention may best be understood, reference first is made to a typical prior art clock regeneration circuit. Also, for the purpose of simplification, it will be assumed that this invention, as well as the prior art circuit, is used to recover data from slant tracks on a magnetic tape of the type typically used in a VTR, such as in an 8 mm VTR.

Referring first to FIG. 5, slant tracks TRA, TRB, TRA, TRB, . . . are recorded on magnetic tape T. Usually, the magnetic tape is driven in the direction represented by the arrow a, and the tracks are recorded by a magnetic head moving across the tape in the direction represented by the arrow b. To record the track pattern illustrated in FIG. 5, two heads A and B are used, each head recording a respective track and, preferably, the alternate tracks TRA, TRB are recorded adjacent to each other with little or, desirably, no guard band therebetween. In what has been generally designated as the 8 mm format, each track is divided into two portions, one portion containing audio information and the other containing video information. This is illustrated in FIG. 5 as track area TRAD, in which digitized audio information is recorded, and track area TRVD, in which video information is recorded. Preferably, the audio information is PCM-encoded; and the PCM signal is time-base compressed.

Figure 3:
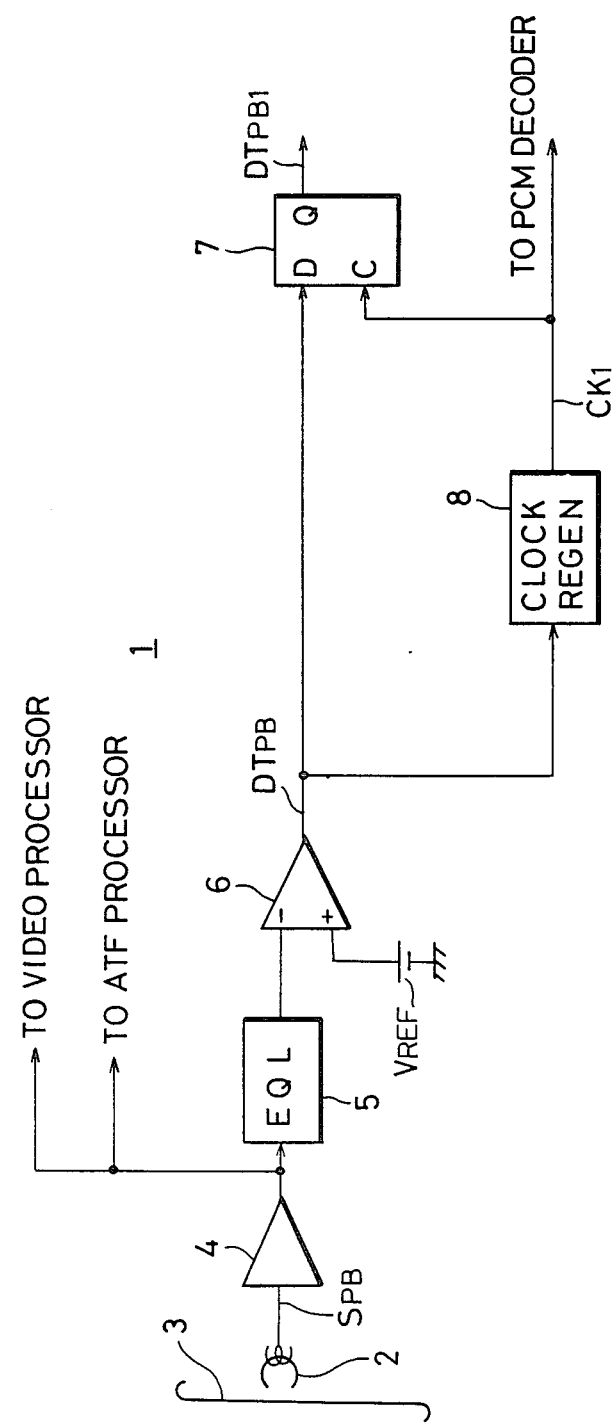
FIG. 3 is a block diagram of a conventional clock regenerator circuit used in typical data reproducing apparatus.

The alternate tracks having the track patterns shown in FIG. 5. are described in aforementioned U.S. Pat. No. 4,551,771. As described therein, the PCM audio information is recorded with so-called biphase-mark modulation. FIG. 3 illustrates a prior art data reproducing apparatus having a clock regeneration circuit for recovering both the video and audio information recorded on tracks TRA, TRB, TRA, TRB, . . . For convenience, only one playback head is illustrated in FIG. 3, although it will be appreciated that two heads typically are used with the audio and video information being reproduced alternately by these heads.

Signals reproduced by head 2 from a track on tape 3 are represented in FIG. 3 as reproduced signal $S_{PB}$, and this signal is amplified by an amplifier 4 and then supplied to an audio signal processing circuit 1 as well as to a video processor and to an automatic track follower (ATF) processor. The video processing of the reproduced signals and the automatic track following operation which is carried out in response to the reproduced signals form no part of the present invention per se. Hence, further description of the video processor and the ATF processor are not provided.

Only a portion of audio signal processor 1 is illustrated. As shown, the reproduced and amplified signal $S_{PB}$ is supplied to an equalizer 5 and then to an amplifier 6. Amplifier 6 is shown as an operational amplifier and functions as a comparator. A reference voltage $V_{REF}$ is compared to the amplified, equalized picked up signal $S_{PB}$ to produce a digital signal $DT_{PB}$. The digital signal is, of course, a two-level signal and, consistent with the recording modulation, is a biphase-mark modulated signal. As is known, this digital signal $DT_{PB}$ includes a clock component; and this component is recovered by clock regeneration circuit 8. Although not shown, it will be appreciated that the clock regeneration circuit includes a phased locked loop and generates a reference clock signal of a frequency equal to the clock component included in digital signal $DT_{PB}$ and phase locked thereto. The recovered clock signal is represented in FIG. 3 as clock signal $CK_1$. This recovered clock signal is supplied to a PCM decoder (not shown) whereat it is used to decode the PCM-encoded audio information included in digital signal $DT_{PB}$. A synchronization circuit 7 also is coupled to receive the digital signal $DT_{PB}$ and functions to synchronize the timing of this digital signal with the recovered clock signal $CK_1$. Synchronization circuit 7 is illustrated as a D-type flip-flop circuit whose data input is coupled to receive the digital signal $DT_{PB}$ and whose clock input is coupled to receive the regenerated clock signal $CK_1$. The output of synchronization circuit 7 is derived from its Q output and is illustrated as a synchronized digital signal $DT_{PB1}$. This synchronized digital signal also is supplied to the PCM decoder (not shown) whereat the audio information included therein is recovered.

As mentioned previously in this specification, 8-10 modulation has been proposed in place of biphase-mark modulation for recording PCM-encoded audio information. 8-10 modulation relies upon a considerably higher bit rate than the biphase-mark modulation and records the PCM-encoded audio data with a higher bit density. Although advantages are attained by using 8-10 modulation, as mentioned above, the higher clock frequency associated with 8-10 modulation may result in a higher bit error rate if the audio processing circuit shown in FIG. 3, having a clock regeneration circuit designed for biphase-mark modulation, is used to recover audio information that has been recorded with 8-10 modulation. In particular, the higher clock frequency of 8-10 modulation (e.g. 14.8 MHz), relative to the clock frequency of biphase-mark modulation (e.g. 11.6 MHz) may result in a higher bit error rate in the demodulated audio information. The reason for the expected higher bit error rate may be explained by referring to the waveform of FIG. 4A and relative timing of clock signals shown in FIG. 4B. FIG. 4A illustrates an "eye" pattern EPN (related to the signal amplitude) of the signal $S_{PB}$ reproduced from magnetic tape 3. Let it be assumed that the reproduced signal had been modulated in accordance with biphase-mark modulation, i.e. modulation of the first type. Clock regeneration circuit functions to regenerate clock signal $CK_1$, shown in FIG. 4B, which is synchronized with the peaks of waveform EPN. This relationship between waveform EPN and clock signal $CK_1$ permits the audio information to be recovered accurately from the reproduced signal $S_{PB}$ with minimal bit error.

Now, let it be assumed that signal $S_{PB}$ had been recorded in 8-10 modulation, that is, the second type of modulation. Using the same clock regeneration circuit as was used to recover the clock signal from the first type of modulation, the resultant clock signal (now referred to as clock signal $CK_2$) produced by clock regeneration circuit 8 appears as the time-shifted signal $CK_2$ shown in broken lines in FIG. 4B. It is seen clearly that the time-shifted signal $CK_2$ derived from the reproduced signal $S_{PB}$ having the second type of modulation no longer coincides with the peaks of waveform EPN. Consequently, when the PCM-encoded audio information is demodulated, the amount of bit error is increased.

The purpose of the present invention is to avoid, or at least minimize, an increase in the bit error rate when a common clock regeneration circuit is used to recover the clock signal from the reproduced digital data $S_{PB}$ regardless of whether that data had been recorded with the first or second type of modulation. Also, this invention functions to recover the clock signal included in the reproduced digital signal $S_{PB}$, and thereby recover the information represented by that digital signal, even if the digital signal had been recorded with higher recording densities.

Turning now to FIG. 1, a preferred embodiment of audio processing circuit 10 is illustrated. Some elements shown in FIG. 1 are identified by the same reference numerals used to identify the same elements in FIG. 3. Accordingly, in the interest of simplification and brevity, further description of these previously described components is not provided. It will be recognized, therefore, that digital signal $DT_{PB}$ is derived from reproduced signal $S_{PB}$ and includes a clock component which may be of a relatively higher or lower frequency, depending upon the type of modulation that had been used to record the signal $S_{PB}$.

Audio signal processor 10, also referred to as data reproducing apparatus, includes a clock regeneration circuit 11 and a PCM decoder (not shown). The following description is directed to the clock regeneration circuit which functions to derive clock signal $CK_{10}$ whose frequency is equal to the frequency of the clock component included in digital signal $DT_{PB}$ and is used to decode the PCM signal. Clock regeneration circuit 11 includes a phase comparator 12, a low pass filter 16 and a voltage controlled oscillator 13, all connected in a phase locked loop known to those of ordinary skill in the art. Low pass filter 16 is comprised of individual low pass filter circuits 16A, 16B, . . . 16H all connected in common to voltage controlled oscillator 13. A switching circuit 14 is adapted to select one of low pass filter circuits 16A-16H for connection between phase comparator 12 and the voltage controlled oscillator. It will be appreciated that each low pass filter circuit exhibits a different time constant; and the particular low pass filter circuit which is selected for connection is determined by a control signal CNT produced by a control circuit 15, to be described. For convenience, switching circuit 14 is illustrated as having an input terminal a coupled to phase comparator 12 and plural output terminal b1-b8, each connected to a respective one of low pass filter circuits 16A-16H. It will be appreciated that the switching circuit preferably is a semiconductor device.

Voltage control oscillator 13 includes a tank circuit 18 having a resonant frequency which determines the frequency of oscillation of the reference signal generated by the voltage controlled oscillator. Tank circuit 18 is formed of individual tank circuits 18A, 18B, . . . 18H, each having a respective resonant frequency and each being individually connected to the voltage controlled oscillator to thereby determine the oscillating frequency of the reference signal produced thereby. As shown, tank circuits 18A-18H all are connected in common to ground and an individual one of these tank circuits is coupled to voltage controlled oscillator 13 by a switching circuit 17. This switching circuit may be similar to aforedescribed switching circuit 14; and the particular tank circuit 18A-18H which is connected to voltage controlled oscillator 13 is determined by control signal CNT produced by control circuit 15.

Voltage controlled oscillator 13 functions to produce clock signal $CK_{10}$; and this signal is phase compared to the clock component included in digital signal $DT_{PB}$ by phase comparator 12. Any phase differential between these signals is filtered by low pass filter 16 and supplied as a control voltage $S_V$ to adjust the reference signal generated by the voltage controlled oscillator. This, of course, is a conventional phase locked loop.

As the frequency of the clock component included in reproduced signal $S_{PB}$ (and, thus, included in recovered digital signal $DT_{PB}$) increases or decreases, the frequency of the reference signal generated by voltage controlled oscillator 13 also should increase or decrease. It is known, however, that typical voltage controlled oscillators have a limited lock-in frequency range. That is, there is a limit on the amount of change permitted in the frequency of the reference signal generated by the voltage controlled oscillator. In the present discussion, it is assumed that the clock component included in signal $DT_{PB}$ which had been modulated in accordance with 8-10 modulation is far beyond the maximum lock-in frequency that can be generated by voltage controlled oscillator 13 if that oscillator is constructed to generate a clock signal matched to that of the clock component included in biphase-mark modulation. Thus, to accommodate the full range of frequencies such that the reference signal generated by voltage controlled oscillator 13 is compatible with the clock component included in signal $DT_{PB}$, regardless of the type of modulation that had been used during recording, different ones of tank circuits 18A-18H are switched to the basic circuitry of the voltage controlled oscillator by means of switching circuit 17. Likewise, as the oscillating frequency of voltage controlled oscillator 13 changes, the time constant of the low pass filter which couples the error signal $S_{CP}$ produced by phase comparator 12 to the voltage controlled oscillator should change in a corresponding manner. A selected one of low pass filter circuits 16A-16H thus is switched by switching circuit 14 so as to couple the error signal $S_{CP}$ from the phase comparator to voltage controlled oscillator 13 as a slowly varying, or DC, voltage $S_V$.

It also has been found that, in addition to the type of modulation used for recording, proper regeneration of the clock signal $CK_{10}$ by voltage controlled oscillator 13 is determined, in part, by the type of magnetic tape that is used. In accordance with one aspect of the present invention, the magnetic tape type is discriminated between so-called coated tape (referred to as MP tape) and vapor deposition tape (referred to as ME tape). Suitable indicia on the tape or tape cassette may be detected to provide such discrimination. MP tape and ME tape exhibit different phase characteristics and, thus, to be compatible with the particular tape which is used, frequency selection of reference signal $S_{VCO}$ generated by voltage controlled oscillator 13 and time constant selection of the low pass filter which is used to supply control signal $S_V$ to the voltage controlled oscillator must be made. As will be described below, switching control signal CNT, which controls switching circuits 14 and 17 to connect the appropriate low pass filter circuit and tank circuit, respectively, is produced by control circuit 15 at least in partial response to a tape type discrimination signal.

Additionally, during a recording operation as well as during a reproducing operation, magnetic tape 3 may be transported at different tape speeds. For example, a so-called standard speed or a so-called long-playing speed may be used to record the information signals. It is appreciated that this tape speed, especially during play back, influences the clock component included in signal $DT_{PB}$. It is helpful, then, to distinguish between standard speed and long play speed of magnetic tape 3 during a playback operation and to control switching circuits 14 and 17 accordingly. It is known that, during a playback operation, an automatic track following operation that is carried out successfully when tape is played back at standard speed will not necessarily be adequate when tape is transported at a long playing speed. Rather, signal adjustments must be made for proper automatic track following during a long-playing play back operation. Hence, the tape transport speed can be determined by the manner in which the automatic track following process is carried out. As will be described, control circuit 15 responds to a signal derived from the automatic track following operation to assist in producing control signal CNT.

Although not shown in FIG. 1, it will be appreciated that a bit error signal $S_{BE}$ is produced by conventional means in response to the demodulation of PCM-encoded signal $DT_{PB1}$, the latter being signal $DT_{PB}$ synchronized with clock signal $CK_{10}$ by synchronization circuit 7. The magnitude of this bit error signal is indicative of the type of modulation used to record the signal $DT_{PB}$.

Similarly, although not shown in FIG. 1, the type of magnetic tape used to record signal $S_{PB}$ is discriminated by well known means to produce a signal $S_{MEP}$ determinative of whether the magnetic tape is coated or vapor deposited. Finally, a signal $S_{ATF}$ produced by the automatic track following processor is indicative of the tape transport speed used during the record/reproducing operation, and particularly during the reproducing operation. Hence, signal $S_{ATF}$ represents whether tape 3 is transported at standard speed or at long playing speed. The respective signals $S_{BE}$ (indicative of the modulation type used to record signal $DT_{PB}$), $S_{MEP}$ (indicative of the type of magnetic tape used during the recording/reproducing operation) and $S_{ATF}$ (indicative of the tape transport speed) are supplied to control circuit 15.

In one embodiment, control circuit 15 includes a microprocessor and a memory in which is stored a look-up table of frequency and time constant selection as a function of signals $S_{BE}$, $S_{MEP}$ and $S_{ATF}$. FIG. 2 is a simplified representation of such a look-up table, wherein frequency and time constant selections are represented as the respective terminals of switching circuits 17 and 14, respectively, which select the particular tank circuit 18A-18H and the particular low pass filter circuit 16A-16H which are connected into the phase locked loop. The type of modulation is determined by signal $S_{BE}$, and this signal indicates whether signal $DT_{PB}$ had been recorded in biphase-mark modulation or 8-10 modulation. The type of magnetic tape used is represented by signal $S_{MEP}$, and this signal indicates either coated (MP) tape or vapor deposited (ME) tape. Finally, the tape transport speed is represented by signal $S_{ATF}$, and this signal indicates either standard speed (SP) or long playing speed (LP). The table of FIG. 2 represents the eight possible selections of frequency and time constant which may be determined by the three signals $S_{BE}$, $S_{MEP}$ and $S_{ATF}$.

As an example, let it be assumed that the first type of modulation had been used to record signal $DT_{PB}$. For instance, let it be assumed that biphase-mark modulation had been used. Let it be further assumed that magnetic tape 3 is vapor deposited (ME) tape and that it is transported at the standard speed (SP). According to the table shown in FIG. 2, control circuit 15 responds to these signals to produce control signal CNT causing switching circuit 14 to connect phase comparator 12 to terminal B3, thereby connecting low pass filter circuit 16C (with its respective time constant) between the phase comparator and voltage controlled oscillator 13. Control signal CNT also causes switching circuit 17 to connect voltage controlled oscillator 13 to terminal D3, thereby connecting tank circuit 18C with its respective resonant frequency to the voltage controlled oscillator. In a similar manner, depending upon signals $S_{BE}$, $S_{MEP}$ and $S_{ATF}$, that is, depending upon the type of modulation which had been used during recording, the type of tape upon which the signals had been recorded and the tape transport speed during at least the play back operation, switching circuits 14 and 17 are controlled to connect a corresponding one of terminals B1-B8 and D1-D8 to phase comparator 12 and to voltage controlled oscillator 13, respectively. In this manner, the appropriate time constant and voltage controlled oscillating frequency are selected to be compatible with the modulation type, tape type and tape transport speed so as to recover clock signal $CK_{10}$ and thereby decode synchronized digital signal $DT_{PB1}$ with minimal bit error. That is, clock signal $CK_{10}$ may be regenerated with optimal phase and frequency, regardless of the particular type of modulation, type of magnetic tape and tape transport speed (i. e. the recording/reproducing mode) that had been used during recording. Consequently, signal $DT_{PB}$ may be demodulated with reduced bit error rate by using a clock signal having correct phase and frequency.

While the present invention has been particularly shown and described with reference to a preferred embodiment, it will be readily appreciated by those of ordinary skill in the art that various changes and modifications may be made without departing from the spirit and scope of the invention. For example, the teachings of this invention are applicable to various types of modulation wherein phase and frequency changes of a demodulating signal (not necessarily a demodulating clock signal) are needed as the type of modulation changes. Hence, this invention is applicable to modulation types other than simply biphase-mark and 8-10 modulation. Furthermore, the tape transport speed to which the present invention is sensitive and, thus, able to adjust the phase and frequency of the demodulating signal (described herein as the regenerated clock signal $CK_{10}$), need not be limited solely to standard and long playing speeds. The present invention also is applicable to recording and/or playback speeds that are substantially faster than standard speed. For example, time constant and frequency selection may be made as a function of standard, slow and fast (e. g. double) transport speeds. Still further, other particular recording/reproducing modes may be discriminated if such modes influence the phase and frequency of the demodulating signal to be used. That is, if the phase and/or frequency of the demodulating signal should be changed as the particular recording/reproducing mode changes, control circuit 15 may be responsive to such mode changes to effect additional time constant and frequency selections.

Still further, although one example of the present invention has been described in the environment of an 8 mm VTR wherein the audio signal is PCM-encoded and demodulated by using this invention, the teachings herein also are applicable to other data reproducing apparatus. For example, audio information recorded on DAT or R-DAT may be recovered by using the teachings of this invention. Other digitally encoded information also may be recovered by the data reproducing apparatus described herein.

Therefore, it is intended that the appended claims be interpreted as including the foregoing as well as equivalents thereto.

What is claimed is:

1. In apparatus which reproduces and demodulates digital data recorded on magnetic tape which is one of plural different types of magnetic tape and which has been recorded in accordance with different types of modulation having different recording densities, clock regeneration circuit including a phase locked loop for regenerating a clock signal for a clock component included in the reproduced data and comprising:
   switchable voltage controlled oscillator means for selecting the frequency of a reference signal generated thereby in correspondence with the type of modulation with which the digital data was recorded;
   phase comparison means for phase comparing the reference signal with a signal derived from the reproduced data;
   switchable low-pass filter means for selecting a time constant thereof in correspondence with the type of modulation with which the digital data was recorded and coupled to said phase comparison means for supplying a control voltage to the voltage controlled oscillator means; and
   control means for additionally controlling the frequency selection of said voltage controlled oscillator means and the time constant selection of said low-pass filter means as a function of said one of the plural different types of magnetic tape on which the digital data was recorded.

2. The apparatus of claim 1 wherein said voltage controlled oscillator means includes plural circuit means, each for establishing a respective reference signal frequency; and switch means responsive to said control means for selecting one of said circuit means to be connected in circuit with said voltage controlled oscillator means.

3. The apparatus of claim 1 wherein said low pass filter means includes plural filter circuits, each having a respective time constant; and switch means responsive to said control means for connecting one of said filter circuits to said voltage controlled oscillator means.

4. The apparatus of claim 1, wherein the magnetic recording medium includes successive record tracks in which audio and video signals are recorded in separate areas; and the digital data is audio data time-base compressed and recorded in an audio signal area as PCM data.

5. The apparatus according to claim 1, wherein said control means includes a programmed table of frequency and time constant selections and is responsive to data supplied thereto to read said table and provide an output command to said voltage controlled oscillator means and to said low pass filter means to control the frequency and time constant selections thereof, respectively.

6. In apparatus which reproduces and demodulates digital data which has been recorded on a magnetic recording medium in accordance with different types of modulation having different recording densities and in one of plural recording/reproducing modes; a clock regeneration circuit including a phase locked loop for regenerating a clock signal from a clock component included in the reproduced data and comprising:

switchable voltage controlled oscillator means for selecting the frequency of a reference signal generated thereby in correspondence with the type of modulation with which the digital data was recorded;

phase comparison means for phase comparing the reference signal with a signal derived from the reproduced data;

switchable low-pass filter means for selecting a time constant thereof in correspondence with the type of modulation with which the digital data was recorded and coupled to said phase comparison means for supplying a control voltage to the voltage controlled oscillator means; and control means additionally controlling the frequency selection of said voltage controlled oscillator means and the time constant selection of said low-pass filter means as a function of said one of the plural recording/reproducing modes.

7. The apparatus of claim 6, wherein the plural recording/reproducing modes are plural transport speeds of said magnetic recording medium, a selected one of which is used during a recording operation, and a corresponding one of which is used during a reproducing operation.

8. The apparatus according to claim 6, wherein said control means includes a programmed table of frequency and time constant selections and is responsive to data supplied thereto to read said table and provide an output command to said voltage controlled oscillator means and to said low pass filter means to control the frequency and time constant selections thereof, respectively.

9. In apparatus which reproduces and demodulates digital data which has been recorded on magnetic tape in accordance with different types of modulation having different recording densities, and wherein the digital data is reproduced in one of plural types of reproducing operation modes; a clock regeneration circuit including a phase locked loop for regenerating a clock signal from a clock component included in the reproduced data and comprising:

switchable voltage controlled oscillator means for selecting the frequency of a reference signal generated thereby in correspondence with the type of modulation with which the digital data was recorded;

phase comparison means for phase comparing the reference signal with a signal derived from the reproduced data;

control means for additionally controlling the frequency selection of said voltage controlled oscillator means and the time constant selection of said low-pass filter means as a function of said one type of the reproducing operation modes.

10. The apparatus of claim 9, wherein the reproducing operation mode includes a tape transport speed which differs from the tape transport speed at which the digital data was recorded.

11. The apparatus according to claim 9, wherein said control means includes a programmed table of frequency and time constant selections and is responsive to data supplied thereto to read said table and provide an output command to said voltage controlled oscillator means and to said low pass filter means to control the frequency and time constant selections thereof, respectively.

12. In apparatus which reproduces and demodulates digital data which has been recorded on a magnetic recording medium in accordance with different types of modulation having different recording densities, a clock regeneration circuit including a phase locked loop for regenerating a clock signal from a clock component included in the reproduced data and comprising:

switchable voltage controlled oscillator means for selecting the frequency of a reference signal generated thereby in correspondence with the type of modulation with which the digital data was recorded;

phase comparison means for phase comparing the reference signal with a signal derived from the reproduced data;

switchable low-pass filter means for selecting a time constant thereof in correspondence with the type of modulation with which the digital data was recorded and coupled to said phase comparison means for supplying a control voltage to the voltage controlled oscillator means; and control means including a programmed table of frequency and time constant selections and being responsive to data supplied thereto to read said table and provide an output command to said voltage controlled oscillator means and to said low pass filter means to control the frequency and time constant selections thereof, respectively.

13. In apparatus which reproduces and demodulates digital data which has been recorded on a magnetic recording medium in accordance with different types of modulation having different recording densities, a clock regeneration circuit including a phase locked loop for regenerating a clock signal from a clock component included in the reproduced data and comprising:

switchable voltage controlled oscillator means for selecting the frequency of a reference signal generated thereby in correspondence with the type of modulation with which the digital data was recorded;

phase comparison means for phase comparing the reference signal with a signal derived from the reproduced data;

switchable low-pass filter means for selecting a time constant thereof in correspondence with the type of modulation with which the digital data was recorded and coupled to said phase comparison means for supplying a control voltage to the voltage controlled oscillator means; and control means for controlling the frequency selection of said voltage controlled oscillator means and the time constant selection of said low-pass filter means, said control means including means responsive to a bit error rate of the reproduced digital data to determine the type of modulation with which the digital data was recorded.

\* \* \* \* \*